United States Patent
Souly et al.

(10) Patent No.: US 12,437,203 B2
(45) Date of Patent: Oct. 7, 2025

(54) APPARATUS, SYSTEM AND METHOD FOR TRANSLATING SENSOR LABEL DATA BETWEEN SENSOR DOMAINS

(71) Applicant: VOLKSWAGEN AKTIENGESELLSCHAFT, Wolfsburg (DE)

(72) Inventors: Nasim Souly, San Mateo, CA (US); Pratik Prabhanjan Brahma, Belmont, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 1211 days.

(21) Appl. No.: 17/179,214

(22) Filed: Feb. 18, 2021

(65) Prior Publication Data
US 2022/0261658 A1    Aug. 18, 2022

(51) Int. Cl.
G06N 3/08        (2023.01)
G06N 3/045       (2023.01)
G06N 3/088       (2023.01)

(52) U.S. Cl.
CPC ............ *G06N 3/088* (2013.01); *G06N 3/045* (2023.01)

(58) Field of Classification Search
None
See application file for complete search history.

(56) References Cited

U.S. PATENT DOCUMENTS

| | | | |
|---|---|---|---|
| 11,537,139 B2* | 12/2022 | Rankawat | G05D 1/0088 |
| 11,551,094 B2* | 1/2023 | Senn | G06F 18/22 |
| 11,693,417 B2* | 7/2023 | George | G05D 1/0221 |
| | | | 701/23 |
| 12,073,329 B2* | 8/2024 | Kapoor | G06N 3/088 |
| 2019/0004534 A1 | 1/2019 | Huang et al. | |
| 2019/0004535 A1* | 1/2019 | Huang | H04N 13/254 |
| 2019/0147331 A1* | 5/2019 | Arditi | G06V 20/58 |
| | | | 706/20 |
| 2019/0197667 A1* | 6/2019 | Paluri | H04N 5/33 |
| 2019/0228236 A1* | 7/2019 | Schlicht | G06V 20/588 |

(Continued)

OTHER PUBLICATIONS

Yu et al. "Pu-net: Point cloud upsampling network." Proceedings of the IEEE Conference on Computer Vision and Pattern Recognition (CVPR) pp. 2790-2799 (2018).

(Continued)

*Primary Examiner* — Maikhanh Nguyen
(74) *Attorney, Agent, or Firm* — Peter Zura; LOZA & LOZA, LLP

(57) ABSTRACT

Technologies and techniques for converting sensor data, used in a vehicle or other device. A machine-learning model is applied to first sensor data, including a first operational characteristic capability and first sensor label data, wherein the machine-learning model is trained to second sensor data including a second operational characteristic capability. New sensor data is generated that corresponds to the applied machine-learning model, wherein the new sensor data includes translated first sensor label data. A loss function may be applied to the new sensor data to determine the accuracy of the new sensor data and translated first sensor label data. In some examples, a multi-dimensional matrix of camera sensor parameters may be applied to the first sensor data labels to transform the first sensor data labels to second sensor data labels.

20 Claims, 11 Drawing Sheets

(56) References Cited

U.S. PATENT DOCUMENTS

| | | | |
|---|---|---|---|
| 2020/0364572 A1* | 11/2020 | Senn | G06N 3/045 |
| 2021/0286923 A1* | 9/2021 | Kristensen | G01S 7/412 |
| 2022/0044118 A1* | 2/2022 | Hüger | G06V 10/454 |

OTHER PUBLICATIONS

Li et al. "PU-GAN: a Point Cloud Upsampling Adversarial Network." Proceedings of the IEEE/CVF International Conference on Computer Vision (ICCV) pp. 7203-7212 (2019).

Qiu et al. "Deeplidar: Deep surface normal guided depth prediction for outdoor scene from sparse lidar data and single color image." Proceedings of the IEEE/CVF Conference on Computer Vision and Pattern Recognition (CVPR), pp. 3313-3322 (2019).

Chen et al. "Learning joint 2D-3D representations for depth completion." Proceedings of the IEEE/CVF International Conference on Computer Vision (ICCV) pp. 10023-10032 (2019).

Wu et al. "Point Cloud Super Resolution with Adversarial Residual Graph Networks." arXiv preprint arXiv:1908.02111 (2019).

Isola et al. "Image-to-image translation with conditional adversarial networks." Proceedings of the IEEE Conference on Computer Vision and Pattern Recognition (CVPR) pp. 1125-1134 (2017).

Liu et al. "Unsupervised image-to-image translation networks." 31st Conf. on Neural Information Processing Systems (NIPS), Long Beach, CA (2017).

Cherian et al. "Sem-GAN: semantically-consistent image-to-image translation." IEEE Winter Conference on Applications of Computer Vision (WACV), Waikoloa, HI, USA, 2019, pp. 1797-1806, doi: 10.1109/WACV.2019.00196 (2019).

Pandey. "An information theoretic framework for camera and lidar sensor data fusion and its applications in autonomous navigation of vehicles." Thesis, A dissertation submitted in partial fulfillment of the requirements for the degree of Doctor of Philosophy (Electrical Engineering-Systems) University of Michigan (2014).

Dou et al. "Asymmetric cyclegan for unpaired NIR-to-RGB face image translation." IEEE International Conference on Acoustics, Speech and Signal Processing (ICASSP), Brighton, UK pp. 1757-1761 (2019).

Kim et al. "Color Image Generation from LiDAR Reflection Data by Using Selected Connection UNET." Sensors 20, 3387 (2020).

Kaji et al. "Overview of image-to-image translation using deep neural networks: denoising, super-resolution, modality-conversion, and reconstruction in medical imaging." researchgate.net (May 21, 2019).

Vaswani et al. "Attention is all you need." 31st Conference on Neural Information Processing Systems (NIPS), Long Beach, CA (2017).

Kim et al. "Asymmetric Encoder-Decoder Structured FCN Based LiDAR to Color Image Generation." Sensors 2019, 19, 4818.

Zhou et al. "Graph Neural Networks:A Review of Methods and Applications." arXiv.org > cs > arXiv:1812.08434 (Jul. 10, 2019).

Coors et al. "NoVA: Learning to see in Novel View Points and Domains." 2019 International Conf. on 3D Vision (3DV), pp. 116-125, doi: 10.1109/3DV.2019.00022.

Bujwid et al. "GANtruth—an unpaired image-to-image translation method for driving scenarios." 32nd Conference on Neural Information Processing Systems (NeurIPS), Machine Learning for Intelligent Transportation Systems Workshop, Montréal, Canada (2018).

Tulsiani et al. "Layer-structured 3D Scene Inference via View Synthesis." Proceedings of the European Conference on Computer Vision (ECCV), pp. 302-317 (2018).

PCT/EP2022/051978. International Search Report & Written Opinion (Jun. 1, 2022).

* cited by examiner

APPARATUS, SYSTEM AND METHOD FOR TRANSLATING SENSOR LABEL DATA BETWEEN SENSOR DOMAINS

TECHNICAL FIELD

The present disclosure relates to processing and translating sensor data from two sensors. More specifically, the present disclosure relates to technologies and techniques for processing and translating sensor data and accompanying label data from two similar operating platforms utilizing machine learning algorithms.

BACKGROUND

Numerous devices and systems are configured today to utilize multiple sensors. In the case of autonomous vehicles, the ability to navigate a vehicle is dependent upon having accurate and precise sensor data, in order to operate in a safe and reliable manner. Many of today's autonomous vehicles are typically equipped with different sensor suites and are calibrated to suit the specific application of the vehicle. During the course of operation, autonomous vehicles will typically require sensor upgrading and/or replacement in order to maintain the vehicle's operational capacity.

One of the issues experienced during sensor replacement and/or upgrade is coordinating the operation of the new or upgraded sensor(s) with the existing autonomous vehicle system. Currently, light detection and ranging (sometimes referred to as active laser scanning), or LiDAR sensors have experienced large growth in the industry. Each LiDAR sensor is typically configured with different physical properties, based on the type of photon emitted, scanning patterns, transmitter-receiver characteristic, and so on. In order to replace one LiDAR with another, machine learning techniques (generally known as "artificial intelligence", or "AI") are used for the existing vehicle system to "learn" the properties of the new LiDAR. In order for a machine-learning model to be able to transfer data from one sensor (e.g., LiDAR) to another, the model has to understand the properties of each sensor, as well as the structure of the objects visible in a point cloud to resolutions in multiple scales. In most cases, this learning process is excessively time-consuming and often expensive to implement. Similar issues arise for other types of sensors, such as cameras, when changing a first sensor with a second sensor.

In some cases, a user may want to operate a first sensor (source sensor) in a manner that simulates or emulates at least one operating characteristic of a second sensor (target sensor). Current techniques for such operation often include up-sampling and related techniques to "upgrade" a sensor from a low-resolution sensor to a higher resolution sensor, and further include machine-learning algorithms such as neural networks to estimate denser data from lower-resolution (sparse) data. However, such techniques typically rely only on point cloud data, and/or are configured to consume only three-dimensional (3-D) volumes as inputs, or output shapes in voxel representations, which is inefficient. Furthermore, when sensor data is being translated from a source sensor to a target sensor, technologies and techniques are needed to translate the accompanying sensor label data as well.

SUMMARY

Various apparatus, systems and methods are disclosed herein relating to sensor label translation. In some illustrative embodiments, a system and method are disclosed for converting sensor data, the method comprising receiving first sensor data from a first sensor, wherein the first sensor data comprises a first operational characteristic capability and first sensor label data; applying a machine-learning model to the first sensor data, wherein the machine-learning model is trained to second sensor data comprising a second operational characteristic capability; generating new sensor data corresponding to the applied machine-learning model, wherein the new sensor data comprises translated first sensor label data; and applying a loss function to the new sensor data to determine the accuracy of the new sensor data and translated first sensor label data.

In some illustrative embodiments, a system and method are disclosed for converting sensor label data, the method comprising receiving the first sensor data from a first sensor, wherein the first sensor data comprises the first operational characteristic capability and first sensor label data; receiving the second sensor data from a second sensor, wherein the second sensor data comprises a second operational characteristic capability that is translated from the first sensor data; applying a machine-learning model to the first sensor data and second sensor data, wherein the machine-learning model is trained to infer first sensor label data to the second sensor data; and generating new sensor data corresponding to the applied machine-learning model, wherein the new sensor data comprises second sensor data and the inferred first sensor label data.

In some illustrative embodiments, a system and method are disclosed for converting sensor label data, the method comprising receiving first sensor data comprising a first operational characteristic capability, wherein the first sensor data comprises first sensor label data; receiving second sensor data comprising a second operational characteristic capability, wherein the second sensor data comprises second sensor label data; and automatically translating the first sensor data to the second sensor data utilizing a machine-learning algorithm, wherein translating the first sensor data comprises applying a multi-dimensional matrix of camera sensor parameters to the first sensor data labels to transform the first sensor data labels to second sensor data labels.

BRIEF DESCRIPTION OF THE FIGURES

The present invention is illustrated by way of example and not limitation in the figures of the accompanying drawings, in which like references indicate similar elements and in which.

DETAILED DESCRIPTION

Figure 1:
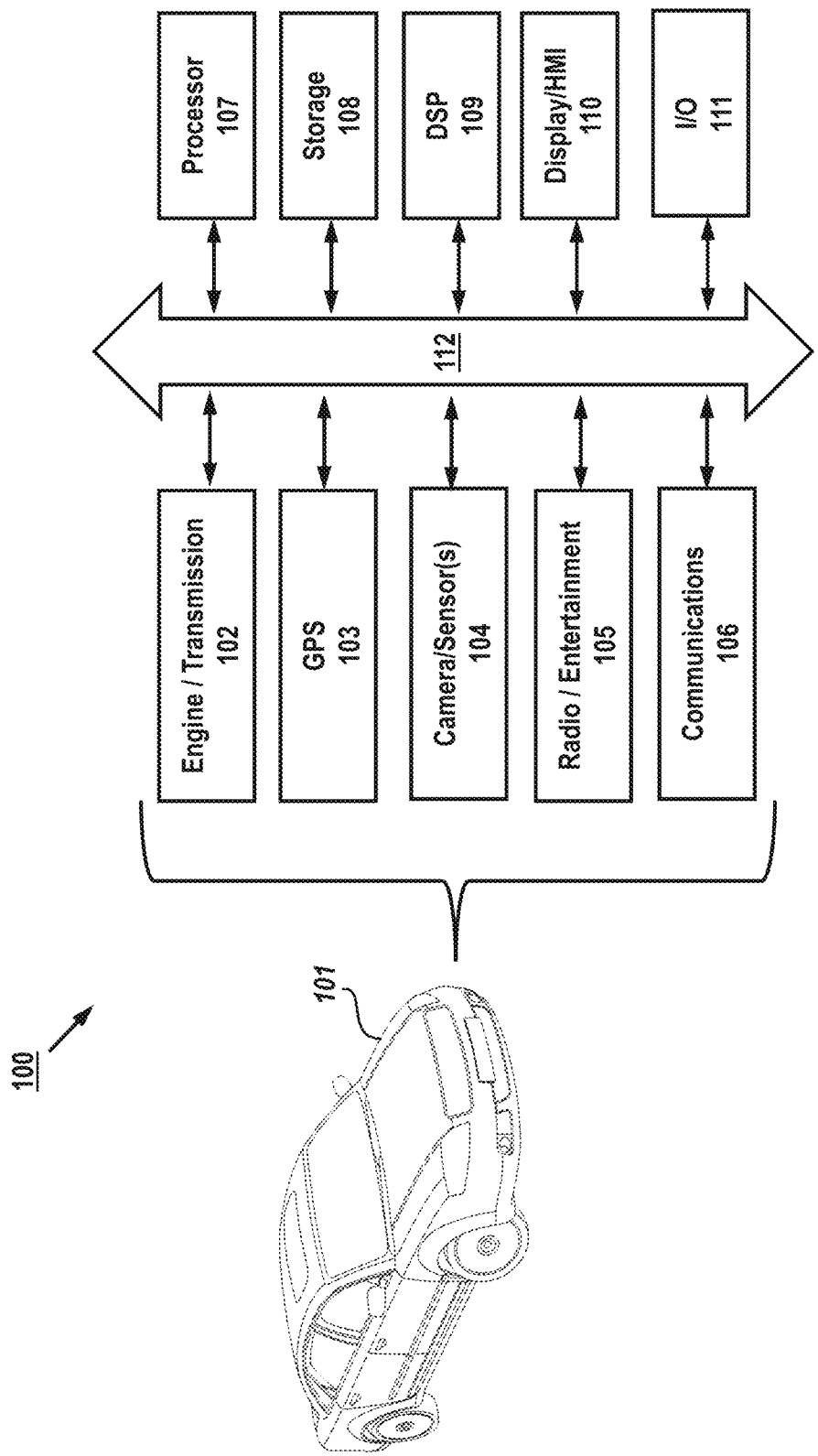
FIG. 1 shows an exemplary vehicle system block diagram showing multiple components and modules according to some aspects of the present disclosure.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that the term "module" as used herein does not limit the functionality to particular physical modules, but may include any number of tangibly-embodied software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via Scalable Language ("Scala"), C, C++, C#, Java, Actionscript, Objective-C, Javascript, CSS, XML, etc.).

Turning to FIG. 1, the drawing illustrates an exemplary system 100 for a vehicle 101 comprising various vehicle electronics circuitries, subsystems and/or components. Engine/transmission circuitry 102 is configured to process and provide vehicle engine and transmission characteristic or parameter data, and may comprise an engine control unit (ECU), and a transmission control. For a diesel engine, circuitry 102 may provide data relating to fuel injection rate, emission control, NOx control, regeneration of oxidation catalytic converter, turbocharger control, cooling system control, and throttle control, among others. For a gasoline and/or hybrid engine, circuitry 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals for any of gasoline, hybrid and/or electrical engines.

Global positioning system (GPS) circuitry 103 provides navigation processing and location data for the vehicle 101. The camera/sensors 104 provide image or video data (with or without sound), and sensor data which may comprise data relating to vehicle characteristic and/or parameter data (e.g., from 102), and may also provide environmental data pertaining to the vehicle, its interior and/or surroundings, such as temperature, humidity and the like, and may further include LiDAR, radar, image processing, computer vision and other data relating to autonomous (or "automated") driving and/or assisted driving. Radio/entertainment circuitry 105 may provide data relating to audio/video media being played in vehicle 101. The radio/entertainment circuitry 105 may be integrated and/or communicatively coupled to an entertainment unit configured to play AM/FM radio, satellite radio, compact disks, DVDs, digital media, streaming media and the like. Communications circuitry 106 allows any of the circuitries of system 100 to communicate with each other and/or external devices (e.g., devices 202-203) via a wired connection (e.g., Controller Area Network (CAN bus), local interconnect network, etc.) or wireless protocol, such as 3G, 4G, 5G, Wi-Fi, Bluetooth, Dedicated Short Range Communications (DSRC), cellular vehicle-to-everything (C-V2X) PC5 or NR, and/or any other suitable wireless protocol. While communications circuitry 106 is shown as a single circuit, it should be understood by a person of ordinary skill in the art that communications circuitry 106 may be configured as a plurality of circuits. In one embodiment, circuitries 102-106 may be communicatively coupled to bus 112 for certain communication and data exchange purposes.

Vehicle 101 may further comprise a main processor 107 (also referred to herein as a "processing apparatus") that centrally processes and controls data communication throughout the system 100. The processor 107 may be configured as a single processor, multiple processors, or part of a processor system. In some illustrative embodiments, the processor 107 is equipped with autonomous driving and/or advanced driver assistance circuitries and infotainment circuitries that allow for communication with and control of any of the circuitries in vehicle 100. Storage 108 may be configured to store data, software, media, files and the like, and may include sensor data, machine-learning data, fusion data and other associated data, discussed in greater detail below. Digital signal processor (DSP) 109 may comprise a processor separate from main processor 107, or may be integrated within processor 107. Generally speaking, DSP 109 may be configured to take signals, such as voice, audio, video, temperature, pressure, sensor, position, etc. that have been digitized and then process them as needed. Display 110 may consist of multiple physical displays (e.g., virtual cluster instruments, infotainment or climate control displays). Display 110 may be configured to provide visual (as well as audio) indicial from any circuitry in FIG. 1, and may be a configured as a human-machine interface (HMI), LCD, LED, OLED, or any other suitable display. The display 110 may also be configured with audio speakers for providing audio output. Input/output circuitry 111 is configured to provide data input and outputs to/from other peripheral devices, such as cell phones, key fobs, device controllers and the like. As discussed above, circuitries 102-111 may be communicatively coupled to data bus 112 for transmitting/receiving data and information from other circuitries.

In some examples, when vehicle 101 is configured as an autonomous vehicle, the vehicle may be navigated utilizing any level of autonomy (e.g., Level 0-Level 5). The vehicle may then rely on sensors (e.g., 104), actuators, algorithms, machine learning systems, and processors to execute software for vehicle navigation. The vehicle 101 may create and maintain a map of their surroundings based on a variety of sensors situated in different parts of the vehicle. Radar sensors may monitor the position of nearby vehicles, while video cameras may detect traffic lights, read road signs, track other vehicles, and look for pedestrians. LiDAR sensors may be configured bounce pulses of light off the car's surroundings to measure distances, detect road edges, and identify lane markings. Ultrasonic sensors in the wheels may be configured to detect curbs and other vehicles when parking. The software (e.g., stored in storage 108) may processes all the sensory input, plot a path, and send instructions to the car's actuators, which control acceleration, braking, and steering. Hard-coded rules, obstacle avoidance algorithms, predictive modeling, and object recognition may be configured to help the software follow traffic rules and navigate obstacles.

Figure 2:
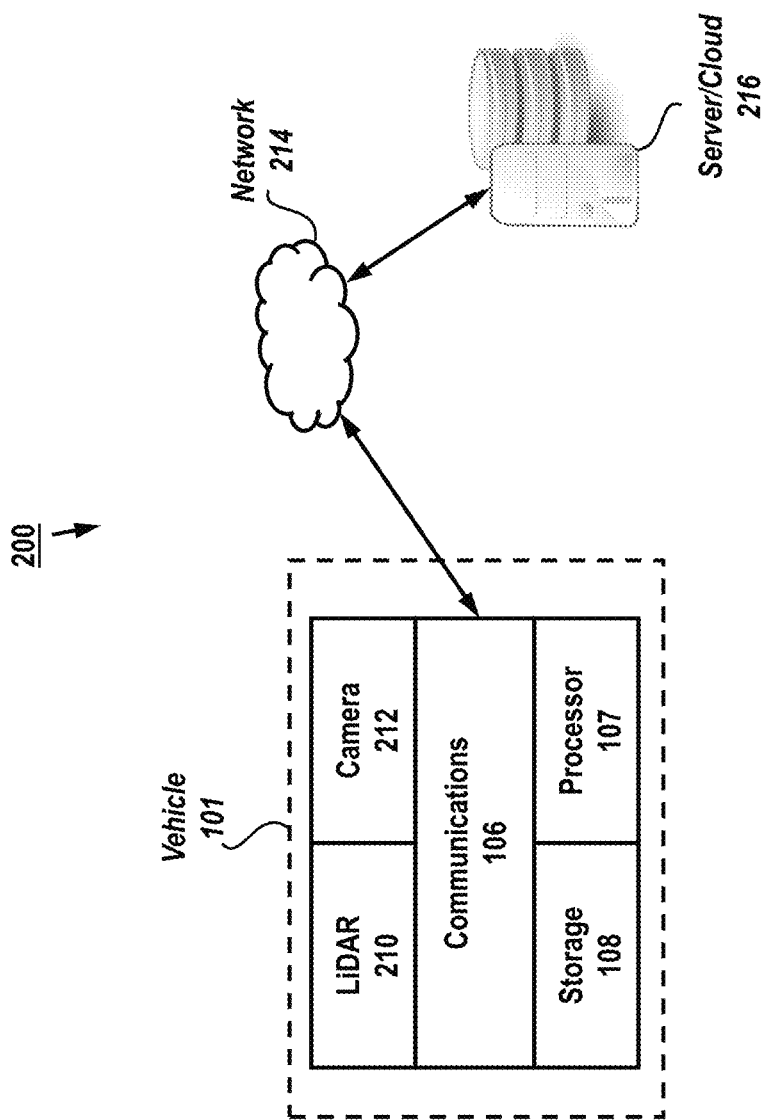
FIG. 2 shows an exemplary network environment illustrating communications between a vehicle and a server/cloud network according to some aspects of the present disclosure.

Turning to FIG. 2, the figure shows an exemplary network environment 200 illustrating communications between a vehicle 101 and a server/cloud network 216 according to some aspects of the present disclosure. In this example, the vehicle 101 of FIG. 1 is shown with storage 108, processing apparatus 107 and communications circuitry 106 that is configured to communicate via a network 214 to a server or cloud system 216. It should be understood by those skilled in the art that the server/could network 216 may be configured as a single server, multiple servers, and/or a computer network that exists within or is part of a cloud computing infrastructure that provides network interconnectivity between cloud based or cloud enabled application, services and solutions. A cloud network can be cloud based network or cloud enabled network. Other networking hardware configurations and/or applications known in the art may be used and are contemplated in the present disclosure.

Vehicle 101 may be equipped with multiple sensors, such as LiDAR 210 and camera 212, which may be included as part of the vehicle's sensor system (104), where LiDAR 210 produces LiDAR data for vehicle 101 operations, and camera 212 produces image data (e.g., video data) for vehicle 101 operations. The vehicle operations may include, but is not limited to, autonomous or semi-autonomous driving. The operational software for LiDAR 210 and/or camera 212 may be received via communications 106 from server/cloud 216 and stored in storage 108 and executed via processor 107. In one example, operational software for LiDAR 210 and/or camera 212 may alternately or in addition be loaded manually, e.g., via I/O 111. Depending on the application, the operational software may be periodically updated automatically and/or manually to ensure that the operating software conforms with the hardware components of the LiDAR 210 and/or camera 212.

When changing or modifying operational characteristics a sensor (e.g., 104, LiDAR 210, camera 212, etc.), the vehicle operator is faced with the issue of going through full cycles of data collection, labeling, model training, integration and testing, etc. in order to ensure the new sensor(s) operate properly in the vehicle. Conventionally, the data associated with an old sensor is not largely applicable to a new sensor that is replacing it, particularly if the old sensor has inferior operating characteristics (e.g., low-resolution) compared to the new sensor (e.g., high-resolution). In the case of LiDARs, as mentioned above, each LiDAR sensor has different physical characteristics, based on the type of photon it emits, scanning patters, transmitter-receiver characteristics, etc. Thus, for a machine-learning model to transfer data from one sensor to another, it has to understand the structure of the objects visible in a point clouds to provide resolution in multiple scales, as well as understand the properties of each sensor.

In some examples, technologies and techniques are disclosed for utilizing data from a sensor having first operating characteristics (source sensor) to "translate" the sensor operation into a second sensor having second operating characteristics (target sensor). In other words, a sensor (e.g., LiDAR, 210, camera 212, or some other sensor) having first operating characteristics may be configured to emulate a second sensor having second operating characteristics. In examples where a source sensor is trained using paired data (e.g., training outputs from the source and target sensor are processed contemporaneously), a machine-learning model may be utilized to translate the source sensor data to emulate the target sensor data. In examples where a source sensor is trained using unpaired sensors (e.g., training outputs from the source and target sensor are not processed contemporaneously) a machine-learning model may be utilized to translate the source sensor data, and then fed back to the machine-learning model to determine if the translated data still correlates to the first sensor data. In some example, encoder-decoder models may be used to implement the machine-learning.

Figure 3:
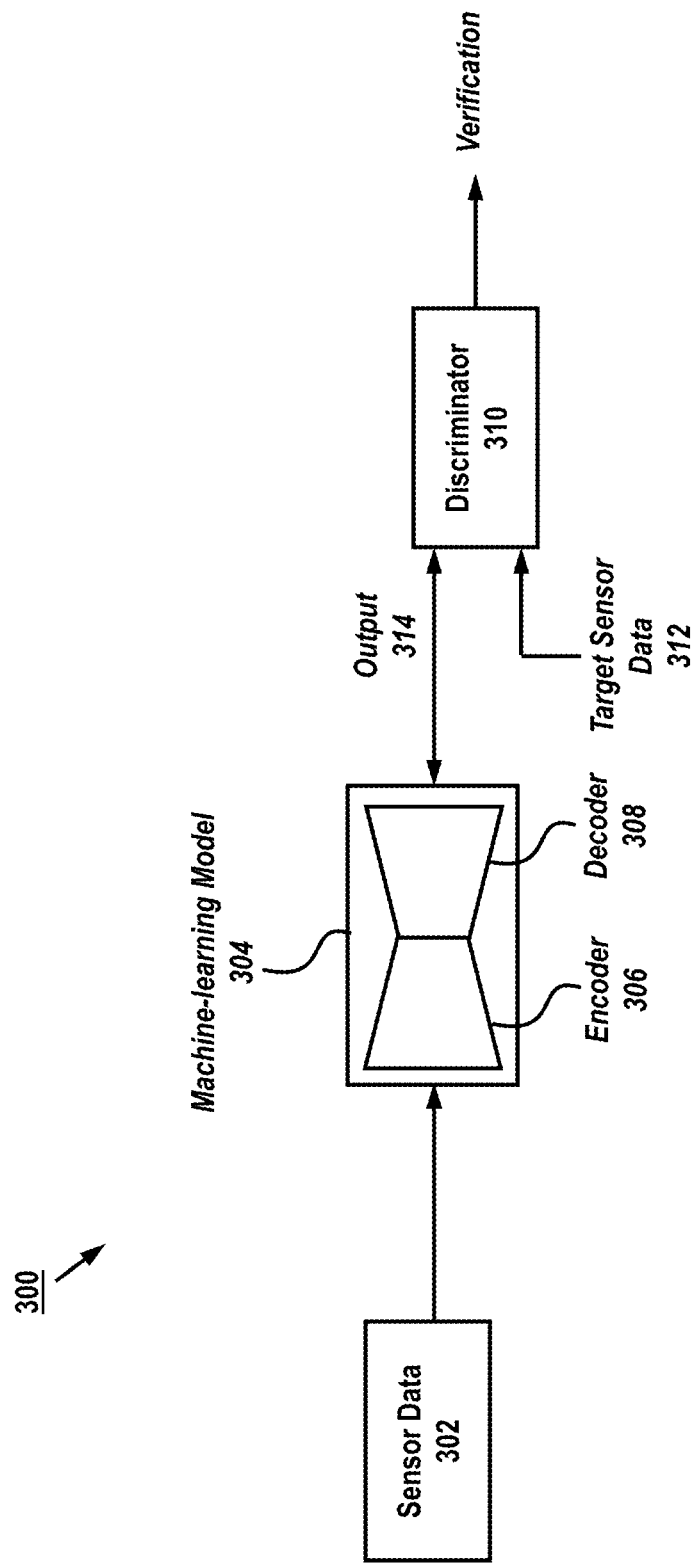
FIG. 3 shows an exemplary block diagram for applying machine learning models to paired sensor data and translating the results according to some aspects of the present disclosure.

FIG. 3 shows an exemplary block diagram 300 for applying machine learning models (304) to paired sensor data and translating the results according to some aspects of the present disclosure. In this example, sensor data 302 from a source sensor (e.g., LiDAR, camera, or some other sensor) is transmitted to a machine-learning model 304. The sensor data 302 may be associated with a source (first) sensor having first operational characteristics. The output 314 of machine-learning model 304 may then be provided to a discriminator 310, which uses measured data from a second (target) sensor, to determine a valid transformed output 316.

The example of FIG. 3 illustrates a configuration utilizing a deep convolutional neural network (DNN) as a machine-learning model 304, configured as an encoder-decoder network (306, 308) and a generative adversarial network (GAN) (e.g., 310). In some examples, the encoder 306 and decoder 308 may be configured with the encoder having multiple down-sampling layers, with increasing numbers of channels, while the decoder is configured with multiple up-sampling layers, with decreasing number of channels. Each down-sampling layer may be configured to reduce the sensor data 302 size by a predetermined amount (e.g., half, quarter) in every dimension. The number of channels may be also selected to be a certain amount (e.g., 2×) of that of the input layer in order to compress the total information in order to reduce and abstract the data. Latent features may be produced from an output from a middle layer of the encoder-decoder configuration, and each up-sampling layer may recover the sensor data by increasing the reduced sensor data by a proportional amount.

The encoder-decoder network (306, 308) may be configured with skip connections that wire the output of respective down-sampling layer(s) to the input of a last up-sampling layer. Multiple inputs to certain ones of the up-sampling layers may be stacked as extra channels. The skip connections may be configured to transfer the raw, non-abstract sensor information directly to the final output. Such a configuration may be advantageous for mitigating the vanishing gradient problem and/or to accelerate learning, among others.

In some examples, the encoder may be configured to receive a plurality of source sensor data (302) inputs ($x_i = x_1, x_2, \ldots$) and the decoder may be configured to receive corresponding target data inputs ($y_i = y_1, y_2, \ldots$). The encoder may select a source sensor data input ($x_i$) and provide it to the decoder, which may then reconstruct the sensor data using $y_i$, where the output may be compared to corresponding actual $y_i$ data (e.g., target sensor data 312 ground truth). The output may then be fed back to the encoder/decoder in order to improve the contents of the processed sensor data until sensor data may be translated from a source sensor to a target sensor without relying on ground truth data (e.g., from 312). The performance of the encoder/decoder may be evaluated using a reconstruction loss function $d(y, y_i)$ that measures differences between the decoder output and target sensor data 312. In some examples, an $L^p$ distance may be used between y' and y, where y' and y are high dimensional vectors. Thus, an $L^2$ distance, representing the mean-squared sensor data error, and the $L^1$ distance, representing a mean absolute sensor data error, may be used.

In some examples, the encoder/decoder (306, 308) may be considered a generator for generating transformed sensor data, while the discriminator 310 may be configured to evaluate the performance of the generator. This performance may be measured in terms of a loss function that may gauge the accuracy of the generator (306, 308) in terms of a value, where, for example, a lower value indicates a more accurate output. In this example, the discriminator 310 may be configured as an encoder-decoder DNN that includes down-sampling layers that are similar to ones used for classification tasks.

Continuing with the example of FIG. 3, the sensor data 302 may be utilized as paired of a paired sensor dataset that includes pairs of aligned sensor data in a source domain A and target domain B. Here, a function of the generator (304) f may be configured to learn to convert $x \in A$ to $f(x) \in B$. Using a paired sensor dataset, the discriminator 310 may be trained to discriminate a pair (x, y) of sensor data and the corresponding measured target sensor data (x, f(x)). The discriminator 310 may be configured to classify the outputs of the generator (304) so that any classification loss may be used to train the discriminator (310) to operate as a conditional GAN. Thus, the generator (304) may be provided with $x \in A$ and be trained to optimize a weighted sum of the reconstruction loss measuring the similarity between y and f(x) and the adversarial loss, which may be considered the negative of the discriminator's loss for (x, f(x)), resulting in a supervised learning mode of operation.

Once processed, the output produced by 314 may be utilized by a vehicle (e.g., 101, via processing apparatus 107) to engage in perception processing to classify/identify sensor objects (e.g., roads, pedestrians, vehicles, etc.) and/or sensed environment conditions (e.g., distance, location, etc.). In one example, the perception processing may be based on further machine-learning techniques such as fast (or faster) region-based convolutional networks (Fast/Faster R-CNN). In one example, two networks may be configured that include a region proposal network (RPN) for generating region proposals and a network for using these proposals to classify/detect objects and/or environments. Instead of using selective search for data of interest, a fast R-CNN may be configured to generate region proposals, where time cost of generating region proposals is smaller in RPN than selective search. The RPN may be configured to share most computation with the object detection network, which may be executed by the processing apparatus 107. The RPN may be configured to ranks region boxes (anchors) and proposes the ones most likely containing objects.

Alternately or in addition, a YOLOv2-based architecture may be used to detect objects and/or environments based on the output produced from 314. In this example, a single neural network may be applied to the output produced by 314, and the data divided into regions, where bounding boxes and probabilities are predicted for each region. The bounding boxes may be weighted by the predicted possibilities. The architecture may be configured to look at the sensor data as a whole at testing, so that predictions may be informed by the global context of the sensor data. In some configurations, techniques such as OverFeat and single-shot multibox detectors (SSD) may be used in a fully-convolutional model to improve training and improve performance.

It should be understood by those skilled in the art that the example of FIG. 3 is merely one example, and that a variety of other suitable machine-learning algorithms and configurations are contemplated in the present disclosure.

Figure 4A:
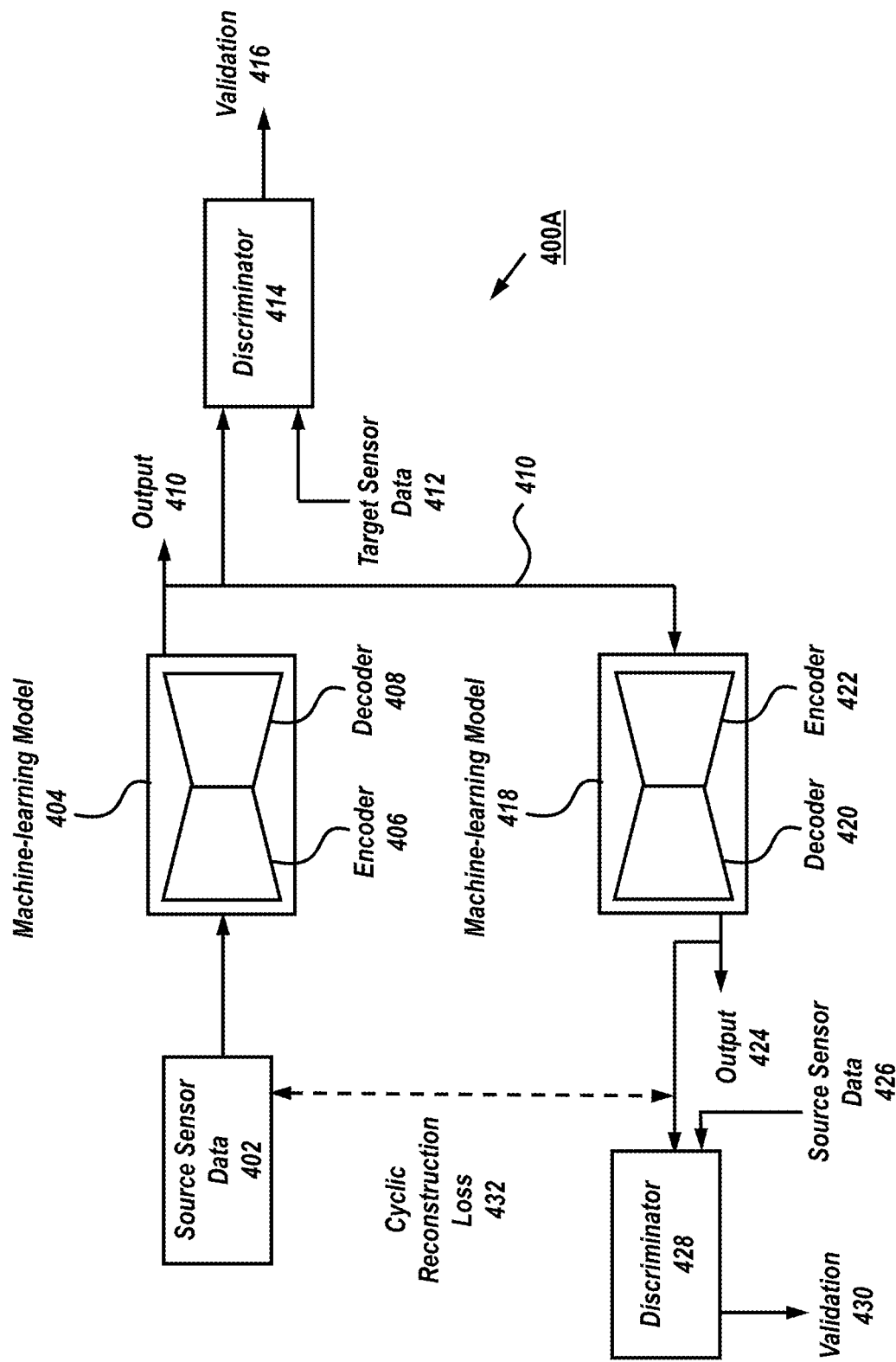
FIG. 4A shows an exemplary block diagram for applying machine learning models to unpaired sensor data and translating the results according to some aspects of the present disclosure.

FIG. 4A shows an exemplary block diagram 400A for applying machine learning models to unpaired sensor data and translating the results according to some aspects of the present disclosure. The block diagram 400 of FIG. 4A may be configured to utilize functionalities described in block diagram 300 of FIG. 3, except that, as an unpaired sensor data environment, the output of machine-learning model 404 is fed back and compared to the source sensor data 402 to determine sensor accuracy for use in object/environment detection in a vehicle (e.g., 101). Here, sensor data 402 is subjected to machine learning model 404 (generator) that includes encoder 406 and decoder 408, which may be similar to encoder/decoder 306, 308 of FIG. 3. Similarly, discriminator 414 may be similar to discriminator 310 of FIG. 3, wherein the discriminator 414 processes the generator (404) output 410 with target sensor data 412 to produce a validated output 416, indicating the accuracy or quality of the sensor data. Additionally, a feedback 410 of the output of 404 is provided in this example, which is transmitted to machine-learning model 418 that includes encoder 422 and decoder 420 that may be configured and trained to convert data in the opposite direction of the target domain produced by machine-learning model 404. The output of machine-learning model 418 may then be transmitted to discriminator 428 that is configured to operate similarly as discriminator 414, except discriminator 428 is configured to discriminate based on the domain of sensor data 402 to produce an output 424, indicating a valid output 424. In an unpaired sensor environment, the output 424 may then be utilized by a vehicle (e.g., 101, via processing apparatus 107) to engage in perception processing to classify/identify sensor objects (e.g., roads, pedestrians, vehicles, etc.) and/or sensed environment conditions (e.g., distance, location, etc.), similar to the examples provided above in connection with FIG. 3.

During operation, unpaired sensor datasets (and sensor label data, explained below) may include sensor data from source domain A and an independent set of sensor data from target domain B. Here, it may not necessarily be known which data in domain A has corresponding data in domain B. Thus, a generator (e.g., 404) may be configured to convert $x \in A$ to $f(x) \in B$, and the discriminator (e.g., 414) may be trained to distinguish real sensor data y from the generated sensor data f(x) using available sensor data 412 (e.g., ground truth). However, in this example, y and x may be independent and may not necessarily correlate to one another. Accordingly, it may be necessary to define a reconstruction loss, if a ground truth sensor data set is unavailable. Here, another generator that includes machine-learning model 418 having encoder 422 and decoder 420, as well as discriminator 428 are configured and trained to covert sensor data in the opposite direction from the target domain B to the source domain A. Thus, converted sensor data may be converted to the original sensor domain and vice-versa, and a cycle consistency loss may be optimized, where the cycle consistency loss may be expressed as $|x-g(f(x))|^2+|y-g(f(y))|^2$. Such a configuration enables unsupervised learning and allows the system to learn one-to-one mappings. Alternately or in addition, cyclic reconstruction loss 432 may be performed between the output 424 of machine-learning model 418 and the source sensor data 402 to improve stability of training. The discriminator 428 may be configured to process output 424 with source sensor data 426 to provide a validation output 430 that determines the accuracy and/or quality of the data.

Suitable machine-learning techniques for translating sensor data may include, but are not limited to, Pix2PixGAN and/or CycleGAN. While such algorithms have been utilized for image translation, they have been found by the inventors to be advantageous in applications using sensor data in various domains (e.g., vehicle camera video, LiDAR, etc.). Instead of taking as input a fixed-size vector, the configuration of FIG. 4 may take sensor data from one domain and output corresponding sensor data in another domain (e.g., LiDAR data from one platform to another). Skip connections may be utilized to ensure that more features flow from input to output during forward propagation and gradients from loss to parameters during back-propagation. In some examples, unlike architectures that classify a whole dataset as valid or invalid, the GAN architecture of FIG. 4 may classify patches of sensor data as valid or invalid by outputting a matrix of values as output instead of a single value. Such a configuration encourages sharper high frequency detail and also to reduces the number of parameters.

In one example, skip connections may be utilized in the encoder/decoder (e.g., similar to a U-Net configuration), where outputs of a down-sampling layer may be wired to the last up-sampling layer, and wherein two inputs to each up-sampling layer may be stacked as extra channels. For training, several techniques may be utilized for stable training including, but not limited to, Wasserstain GAN with gradient penalty (WGAN-GP), progressive growing GAN (PGGAN) and/or spectral normalization. Additional noisereduction techniques may further be applied to provide sensor data output with improved characteristics.

Figure 4B:
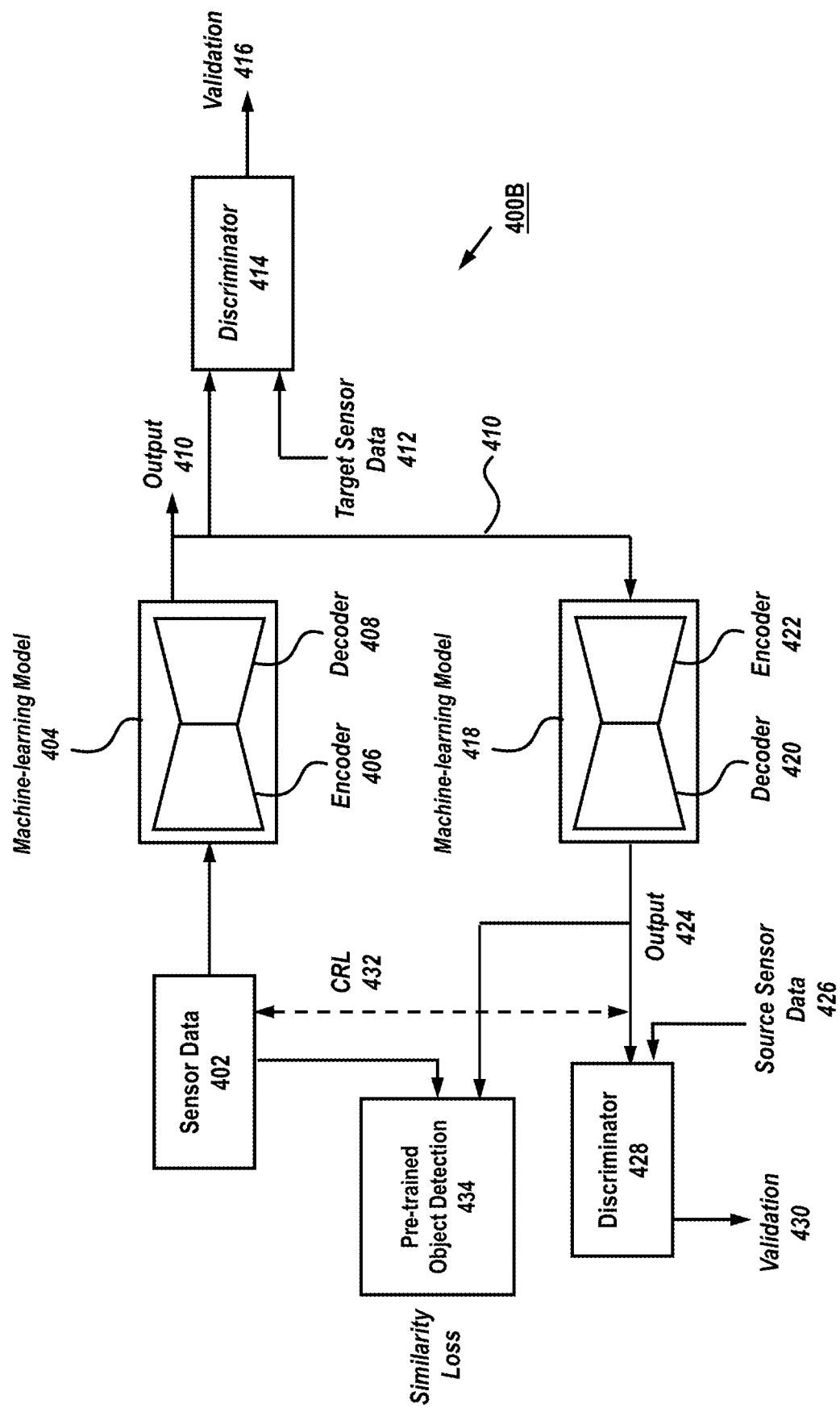
FIG. 4B shows an exemplary block diagram for applying machine learning models to unpaired sensor data and translating the results according to some aspects of the present disclosure

FIG. 4B shows an exemplary block diagram 400B for applying machine learning models to unpaired sensor data and translating the results according to some aspects of the present disclosure. The block diagram 400B of FIG. 4B may be configured to utilize functionalities described in block diagram 400A of FIG. 4A, except that the feedback for the sensor data is focused on objects of interest for use in object/environment detection in a vehicle (e.g., 101). Here, sensor data 402 is subjected to machine learning model 404 (generator) that includes encoder 406 and decoder 408, which may be configured similarly as described in FIG. 4A. Similarly, discriminator 414 may be configured similarly as described in FIG. 4A, wherein the discriminator 414 processes the generator output 410 with target sensor data 412 to produce a validated output 416, indicating the accuracy or quality of the sensor data. Additionally, a feedback 410 of the output of 404 is provided in this example, which is transmitted to machine-learning model 418 that includes encoder 422 and decoder 420 that may be configured and trained to convert data in the opposite direction of the target domain produced by machine-learning model 504. The output of machine-learning model 418 may then be transmitted to discriminator 428 that is configured to operate similarly as described in FIG. 4A, except discriminator 428 is configured to discriminate based on the domain of source sensor data 426 to produce a validation output 430 indicating the accuracy/quality of the translated signal (424). In an unpaired sensor environment, the output 424 may then be utilized by a vehicle (e.g., 101, via processing apparatus 107) to engage in perception processing to classify/identify sensor objects (e.g., roads, pedestrians, vehicles, etc.) and/or sensed environment conditions (e.g., distance, location, etc.).

As discussed above, during operation, unpaired sensor datasets may include sensor data from source domain A and an independent set of sensor data from target domain B. A generator (e.g., 404) may be configured to convert x∈A to f(x)∈B, and the discriminator (e.g., 414) may be trained to distinguish real sensor data y from the generated sensor data f(x) using available sensor data 412 (e.g., ground truth). In some examples, it may be necessary to define a reconstruction loss, if a ground truth sensor data set is unavailable. Here, another generator that includes machine-learning model 418 having encoder 422 and decoder 420, as well as discriminator 428 are configured and trained to covert sensor data in the opposite direction from the target domain B to the source domain A. Thus, converted sensor data may be converted to the original sensor domain and vice-versa, and a cycle consistency loss may be optimized. Such a configuration enables unsupervised learning and allows the system to learn one-to-one mappings. Alternately or in addition, cyclic reconstruction loss may be performed between the output 424 of machine-learning model 418 and the source sensor data 426 to improve stability of training. The discriminator 428 may be configured to process the output 424 with source sensor data 426 to provide a validation output 430 that determines the accuracy and/or quality of the data. Suitable machine-learning techniques for translating sensor data may include, but are not limited to, Pix2PixGAN and/or CycleGAN. Alternately or in addition, the output 424 of machine-learning model 418 may be transmitted to pre-trained object detection circuit 434 (and/or pre-trained object detection network) to be processed with source sensor data 402 to determine similarity losses of objects of interest.

In addition to translating the sensor data, technologies and techniques are disclosed herein to translate the corresponding sensor label (also known as annotation) data. Typically, for vehicle systems, changing a sensor from a first (source) sensor to a second (target) sensor has proven to be challenging, as users need to implement full-cycle sensor efforts, including data collection, labeling, model training, integration and repeating the testing with the new sensor. Generally, dataset collection for deep-learning algorithms can generally be categorized into a plurality of groups. One group of dataset collection techniques may include the process of collection of real sensor data and hand-labeling the data, while another group may include the use of simulators to generate simulated data pertaining to the sensor. In autonomous driving applications, each time a new sensor is introduced, extended driving processes are required to collect sufficient data, and costly and time-consuming labeling efforts are required to get the data labeled. In order to reduce this cost, simulation data may be used to achieve at least some of the labeling efforts.

Accordingly, technologies and techniques are disclosed for translating labels alongside sensor data when changing a source sensor to a target sensor. The label translation may be performed contemporaneously with the sensor translation, although other configurations are contemplated in the present disclosure. The examples provided below may be used in various scenarios, depending on the available data and sensor configurations.

In one example, it may be the case that labeling data for each of a source/target sensor are already available. This represents a simpler case, as both datasets are capable of being processed directly. Here, it may be assumed in the example that camera sensor parameters and vehicle coordinates are known when a source LiDAR is being translated to a target LiDAR. Camera sensor parameters (as well as LiDAR sensor parameters) may include intrinsic, extrinsic, and distortion coefficients, where the camera sensor parameters represent 3-D world points and their corresponding 2-D image points. The camera sensor parameters may be represented by a multi-dimensional matrix (e.g., 4×3), referred to as a camera matrix, where the camera matrix maps a 3-D world scene into an image plane. A suitable calibration algorithm may calculate the camera matrix using the extrinsic and intrinsic parameters, where the extrinsic parameters represent the location of the camera sensor in the 3-D scene, and the intrinsic parameters represent the optical center and focal length of the camera. The extrinsic parameters may be represented as w[x y 1]=[X Y Z 1]P, where w is a scale factor, x and y are image points, X, Y, Z and world points, and P is the camera matrix. Thus, the camera matrix P may be represented as $$P = \left[\frac{R}{t}\right]K,$$

where R represents extrinsic rotation, t represents translation and K represents an intrinsic matrix. The world points may be transformed to camera coordinates using the extrinsic parameters, and the camera coordinates may be mapped into the image plane using the intrinsic parameters.

For calibration, the calibration algorithm may be configured to calculate the camera matrix using the extrinsic and intrinsic parameters. The extrinsic parameters represent a rigid transformation from 3-D world coordinate system to the 3-D camera's coordinate system. The intrinsic parameters represent a projective transformation from the 3-D camera's coordinates into the 2-D image coordinates. The extrinsic parameters include a rotation R and translation $$t\left(\left[\frac{R}{t}\right]\right).$$

The origin of the camera coordinate system may be configured at its optical center, and its x- and y-axis may define the image place. The intrinsic parameters include the focal length (f), the optical center (c), also known as the principal point, and the skew coefficient (s). The camera intrinsic matrix, K, may be defined as $$\begin{bmatrix} f_x & 0 & 0 \\ s & f_y & 0 \\ c_x & c_y & 1 \end{bmatrix},$$

where [$c_x$, $c_y$] represent an optical center in pixels, ($f_x$, $f_y$) represent focal length in pixels, $f_x$=F/$p_x$, $f_y$=F/$p_y$, F, representing focal length in world units (e.g., millimeters) and ($p_x$, $p_y$) represents size of a pixel in world units; s represents the skew coefficient, which is non-zero in instances where the image axes are not perpendicular, and have a skew angle α, where s=$f_x$ tan α.

Accordingly, in some examples, when utilizing intrinsic parameters as they relate pixel coordinates to camera reference frames, projected space $\tilde{x}_s$ matrix may be expressed as $$\tilde{x}_s = K[R|t]p_w = Pp_w,$$

where K represents the calibration matrix, R represents rotation, t represents translation, $p_w$ represents a world coordinate point (in scene coordinates) and P represents the camera matrix. Using the example of a camera sensor, during sensor translation as described above, which includes label data, the camera matrix P$p_w$ may be utilized to translate the label data from a source camera sensor to a target camera sensor. In some examples, given that points and camera matrices are understood between two domains (i.e., source/target), characteristics, such as the bounding box(es) and points in one image of a source camera sensor can be used to first find real world coordinates. Then utilizing a camera matrix for the target camera sensor, as well as real world coordinates of the target camera sensor, the processing may obtain the corresponding labels from the second images of the second camera sensor automatically. Accordingly, corresponding points in an image may be located using camera matrices. In some examples, each 2-dimensional (2D) point in one camera sensor may be treated as belonging to a ray in real world coordinates. If two cameras are aligned, the calibration matrices may be used to match points between them, and 3D real world coordinate points may be determined, as well as relationships between sensor coordinates.

Of course, there may be instances where points and/or camera matrices are not known a priori between both of the two domains in the course of a sensor translation. In such an instance, the camera matrices approach described above would not work. However, utilizing a GAN approach, similar to the examples provided above, the processing of label data together with the raw sensor data may be particularly effective.

Figure 5:
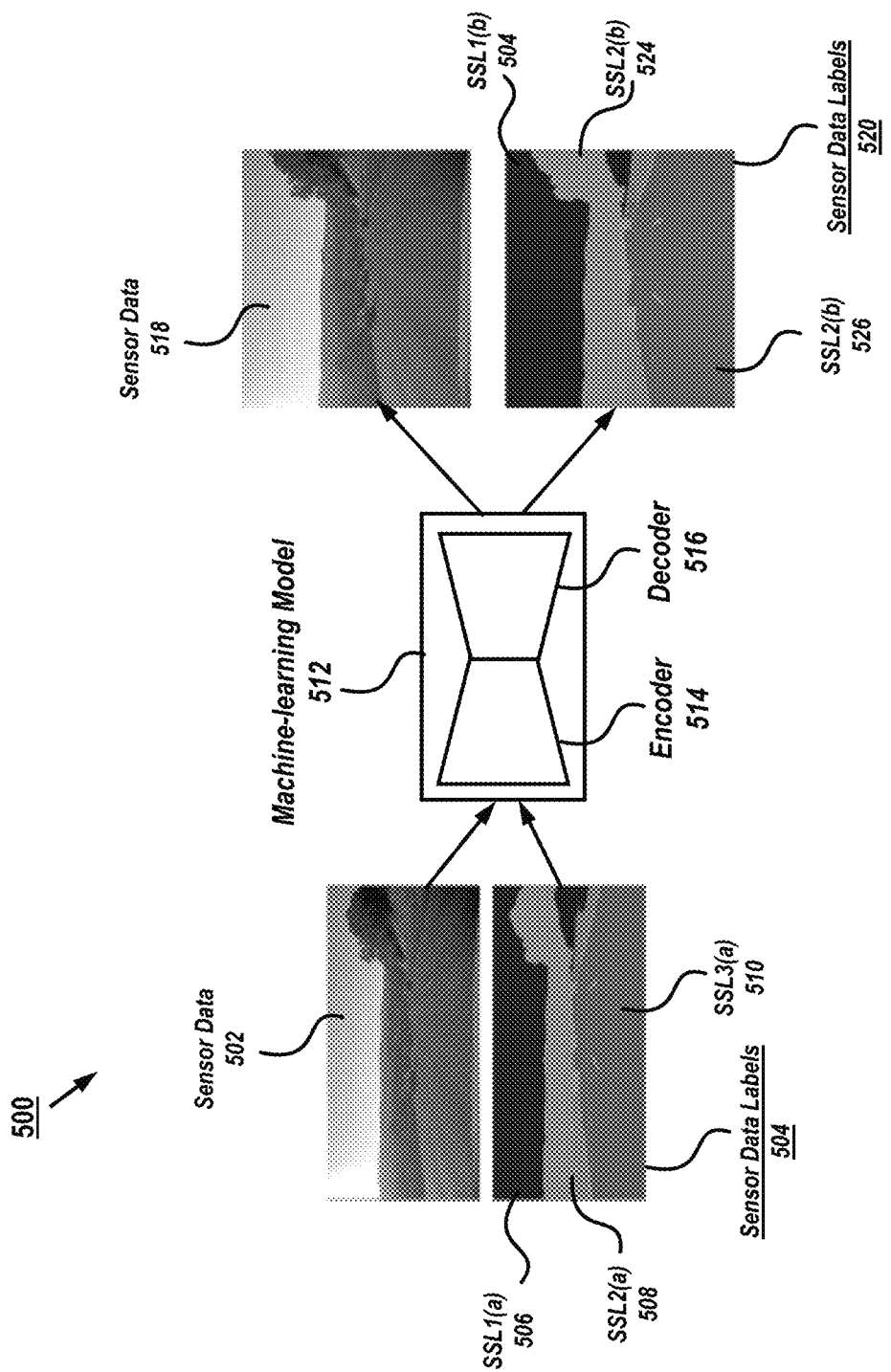
FIG. 5 shows a simplified block diagram of translating sensor data and associated sensor label data and semantic segmentation utilizing machine learning under some aspects of the disclosure.

FIG. 5 shows a simplified block diagram 500 of translating sensor data (502) and associated sensor label data (504) utilizing machine learning under some aspects of the disclosure. In this example, sensor data 502 is produced via a sensor (e.g., 210, 212) and processed to generate sensor data labels 504 that may be configured as a label map. In this simplified example, the sensor data labels 504 associated with sensor data 502 are configured as semantic segmentation labels (SSL) associated with a source camera sensor ("a") and include SSL1(a) 506, SSL2(a) 508 and SSL3(a) 510. A semantic segmentation architecture can be broadly thought of as an encoder network followed by a decoder network. An encoder is usually is a pre-trained classification network (e.g., VGG/ResNet, SegNet) followed by a decoder network. The decoder may be configured to semantically project the discriminative features learnt by the encoder onto the pixel space to obtain a dense classification. Semantic segmentation requires discrimination at pixel level and also utilizes a mechanism to project the discriminative features learnt at different stages of the encoder onto the pixel space. Depending on the application, different approaches may be used to employ different mechanisms as a part of the decoding mechanism.

In some examples, the encoder for semantic segmentation may be configured to perform convolution with a filter bank to produce a set of feature maps. These are then batch normalized, and an element-wise rectified linear non-linearity (ReLU) max(0, x) is applied. Following that, max-pooling with a 2×2 window and stride 2 (non-overlapping window) may be performed and the resulting output is sub-sampled by a predetermined factor (e.g., 2). Max-pooling may be used to achieve translation invariance over small spatial shifts in the input image. Boundary information may be captured and stored in the encoder feature maps before sub-sampling performed. If memory during inference is not constrained, then all the encoder feature maps (after sub sampling) can be stored. In some examples, only the max-pooling indices (i.e, the locations of the maximum feature value in each pooling window) are stored for each encoder feature map. In principle, this can be done using 2 bits for each 2×2 pooling window and thus may be more efficient to store as compared to memorizing feature map(s) in float precision.

A decoder network for semantic segmentation may up-sample the input feature map using the memorized max-pooling indices from the corresponding encoder feature map(s). This step produces sparse feature map(s). These feature maps may then be convolved with a trainable decoder filter bank to produce dense feature maps. A batch normalization step may then be applied to each of these maps. In some examples, a decoder corresponding to a first encoder may be configured to produce a multi-channel feature map. Alternately or in addition, a decoder may be configured to produce feature maps with the same number of size and channels as their encoder inputs. A high dimensional feature representation at the output of the final decoder may be fed to a trainable soft-max classifier. This soft-max may be configured to classify each pixel independently. The output of the soft-max classifier may be configured as a K channel image of probabilities where K is the number of classes. The predicted segmentation corresponds to the class with maximum probability at each pixel.

The sensor data labels 504 for the sensor data 502 of a source sensor may both then be applied to machine-learning model 512 that comprises encoder 514 and decoder 516. The machine-learning model 512 may be configured similarly as the machine-learning model 304 for sensor translation described above in connection with FIG. 3, except that machine learning model 514 is additionally configured to process sensor data labels 504, and well as sensor data 502.

Using similar translation techniques described above, the machine-learning model 514 is configured to output the translated sensor data 518 (e.g., from source-to-target), as well as translated sensor data labels 520 that include translated semantic segmentation labels (SSL) for target camera sensor ("b") and include translated segmentation labels SSL1(*b*) 522, SSL2(*b*) 524 and SSL3(*b*) 526 that correspond to labels 506, 508, 510. By applying a loss function, such as consistency loss function as described herein, both the sensor data and label data may be checked to determine validity.

Figure 6:
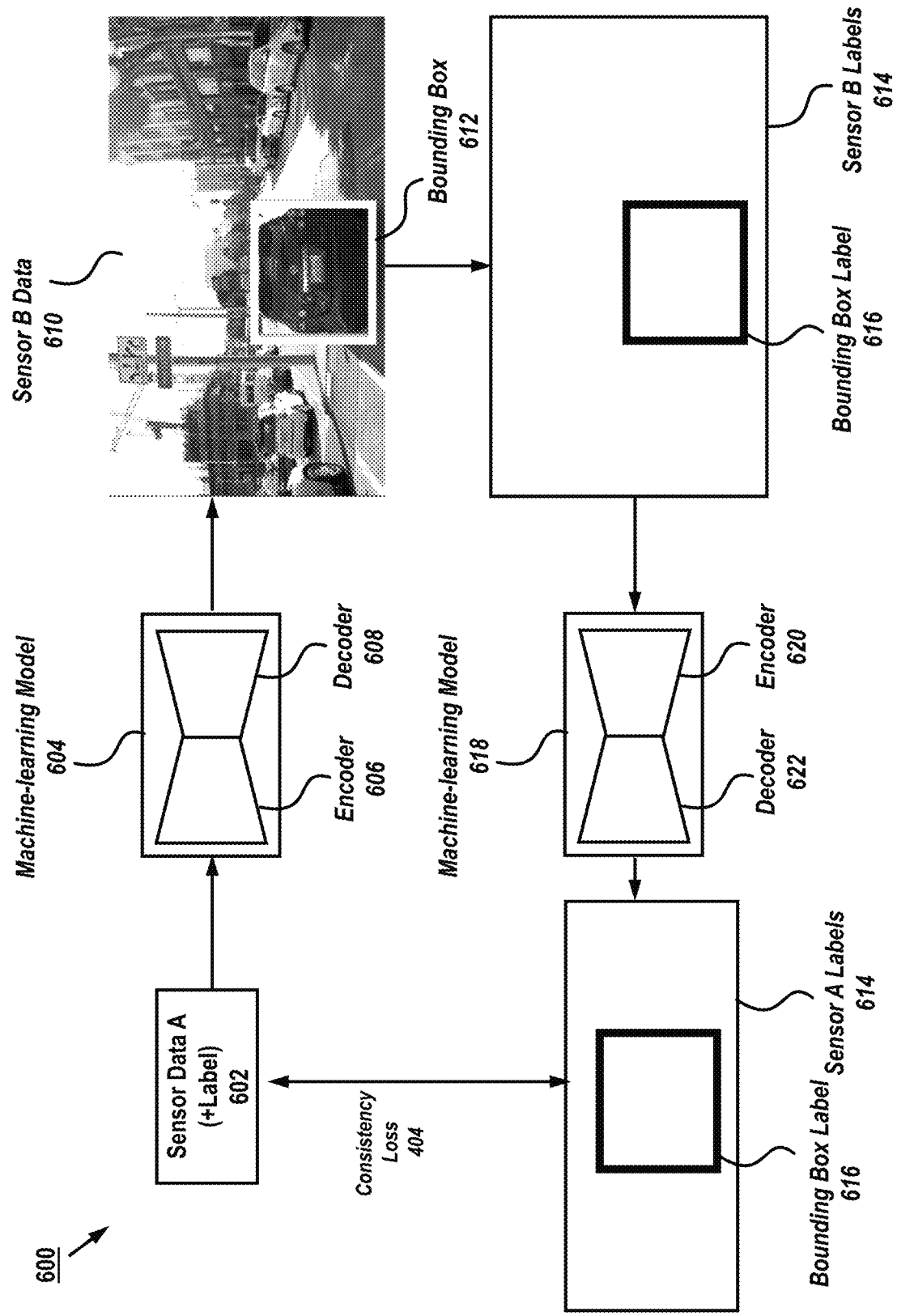
FIG. 6 shows an exemplary block diagram for applying machine learning models to sensor data and associated label data and object detection, and translating the results for each, according to some aspects of the present disclosure.

FIG. 6 shows an exemplary block diagram 600 for applying machine learning models to sensor data and associated label data, and translating the results for each, according to some aspects of the present disclosure. In this example, the block diagram 600 may be utilized in an unpaired sensor translation system such as the one shown in FIG. 4, where machine-learning model 604, encoder 606 and decoder 608 is similar to 404, 406 and 408, respectively. Similarly, machine-learning model 618, encoder 622 and decoder 624 is similar to 416, 418 and 420, respectively.

Sensor data from a source sensor ("A"), which includes label data 602 is provided to machine-learning model 604 that is configured to operate as a generator (generative network) to translate sensor data and label data from source sensor A to produce sensor B data 610 (target sensor data) that may include sensor B label data, which in this example includes bounding box 612. The sensor B labels are then used in 614, including bounding box 616 and transmitted to machine-learning model 618 which is configured and trained to covert sensor data in the opposite direction from the target domain B to the source domain A. The machine learning model 618 then outputs the sensor A labels 614, including bounding box label 616. Here, a consistency loss function is applied 404, against the label data of the sensor A 602 to determine the validity/accuracy of the label data translation.

Figure 7:
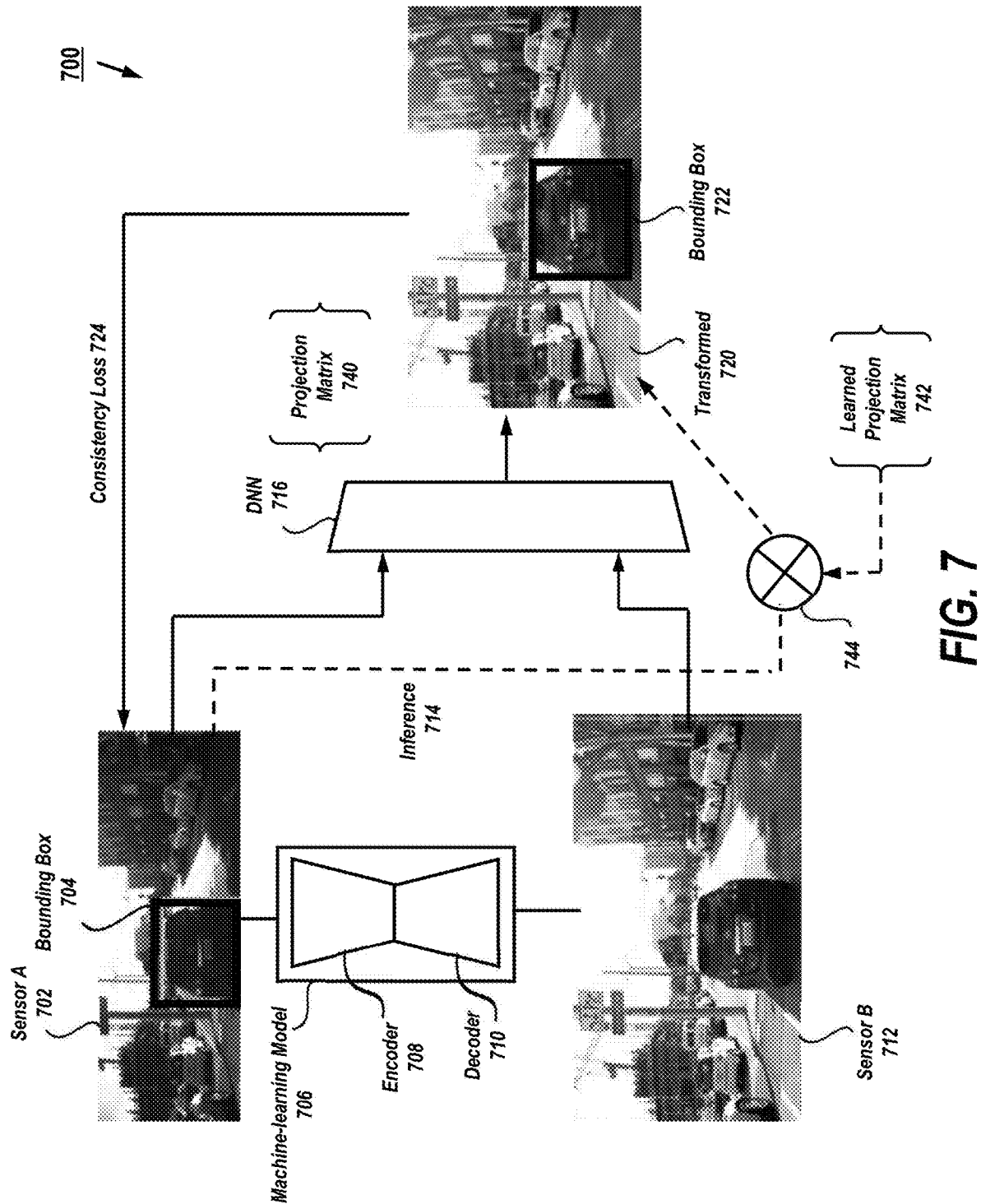
FIG. 7 shows an exemplary block diagram for applying machine learning models to unpaired sensor data and associated label data, estimating projection matrices, and translating the results for each in a self-supervised manner, according to some aspects of the present disclosure.

FIG. 7 shows an exemplary block diagram 700 for applying machine learning models to unpaired sensor data and associated label data, estimating projection matrices, and translating the results for each in a self-supervised manner, according to some aspects of the present disclosure. In this example, an end-to-end approach is disclosed to estimate project matrices between two sensor data streams (702, 712) without using paired sensors or supervision on calibration matrix estimation. Unlike the previous examples, a DNN 716 is utilized in a self-supervised configuration, where the DNN is trained to automatically estimate the transformation parameters (extrinsic calibration) between sensor A and sensor B.

In this example, a machine learning model 706, that includes encoder 708 and decoder 710, translates sensor data from sensor A 702 (source sensor) to sensor B (target sensor) 712. Machine-learning model 706 may be configured similarly to machine-learning model 304 of FIG. 3. Sensor A data 702 also includes label data that may include bounding box 704. However, in this example, the sensor label data for sensor A cannot be directly translated to sensor B using machine-learning model 706. Accordingly, the sensor data from sensor A 702 (including label data 704) and sensor B 712 are transmitted to DNN 716 as shown in the figure, where DNN 716 infers (714) or interpolates a predicted label output from sensor A 702 for sensor B 712 to have a substantially same resolution/shape as the source sensor (sensor A) and may be configured to determine feature/classification similarities. In a training mode of operation, the output of DNN 716 may generate a learned projection matrix 740. In some examples, instead of using simple bilinear resizing, cycle consistency object detection may be used and weighted reconstruction may be executed on the data. The inference of 714 may, for example, be performed by processing the extrinsic parameters (e.g., projection matrix multiplication) from the label data 704. Accordingly, a transformed sensor data output 720 may be produced from the DNN 716 that includes the sensor B (target sensor) data, and may further include label data, such as bounding box 722 that was inferred from sensor A (source sensor). A consistency loss function 724 may be applied (e.g., via CycleGAN) between the label data (722) from the transformed sensor data and the label data (704) from the source sensor to determine validity and/or accuracy. During operation, an extrinsic projection matrix (740) is learned during training. During inference 714 (application of model), the learned projection matrix 742 is used to transfer sensor labels (e.g., by performing multiplication via 744) to the transformed sensor data output 720.

Figure 8:
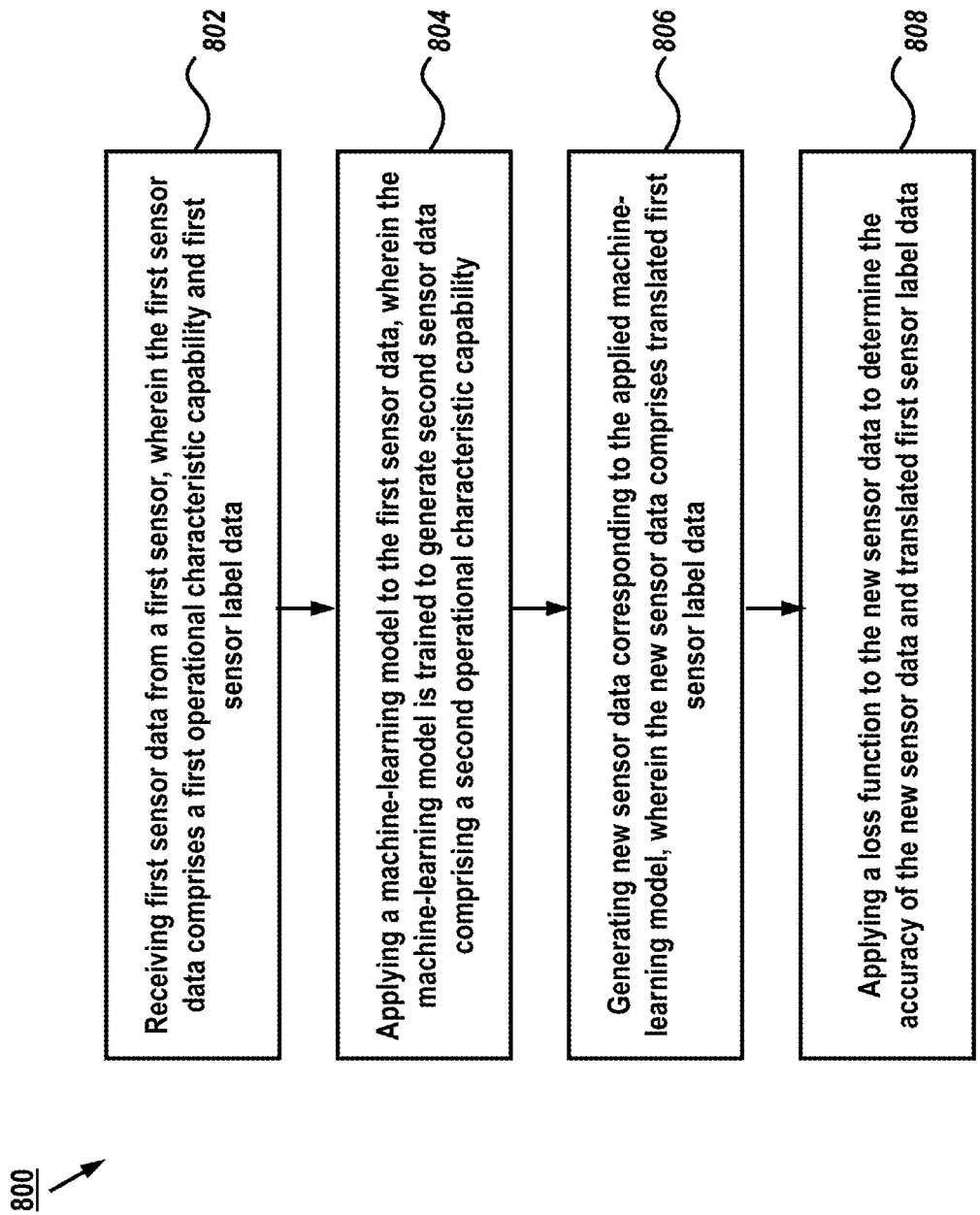
FIG. 8 shows a process flow for converting sensor data under some aspects of the present disclosure.

FIG. 8 shows a process flow 800 for converting sensor data under some aspects of the present disclosure. In block 802, a processing system receives first sensor data from a first sensor (e.g., 502, 602), wherein the first sensor data comprises a first operational characteristic capability and first sensor label data. In block 804, the processing system applies a machine-learning model (e.g., 512, 604) to the first sensor data, wherein the machine-learning model is trained to second sensor data comprising a second operational characteristic capability. In some examples, the training may be executed on a configuration such as that described in FIGS. 5-7, where converted (translated) data may be validated via discriminator(s) (e.g., 604, 618, 706) for data improvement and ultimately direct transmission, when the model is fully trained. In block 806 the processing system generates new sensor data (e.g., 518, 610) corresponding to the applied machine-learning model, wherein the new sensor data comprises translated first sensor label data (e.g., 520, 614). In block 808 the processing system applies a loss function (e.g., consistency loss function) to the new sensor data to determine the accuracy of the new sensor data and translated first sensor label data.

Figure 9:
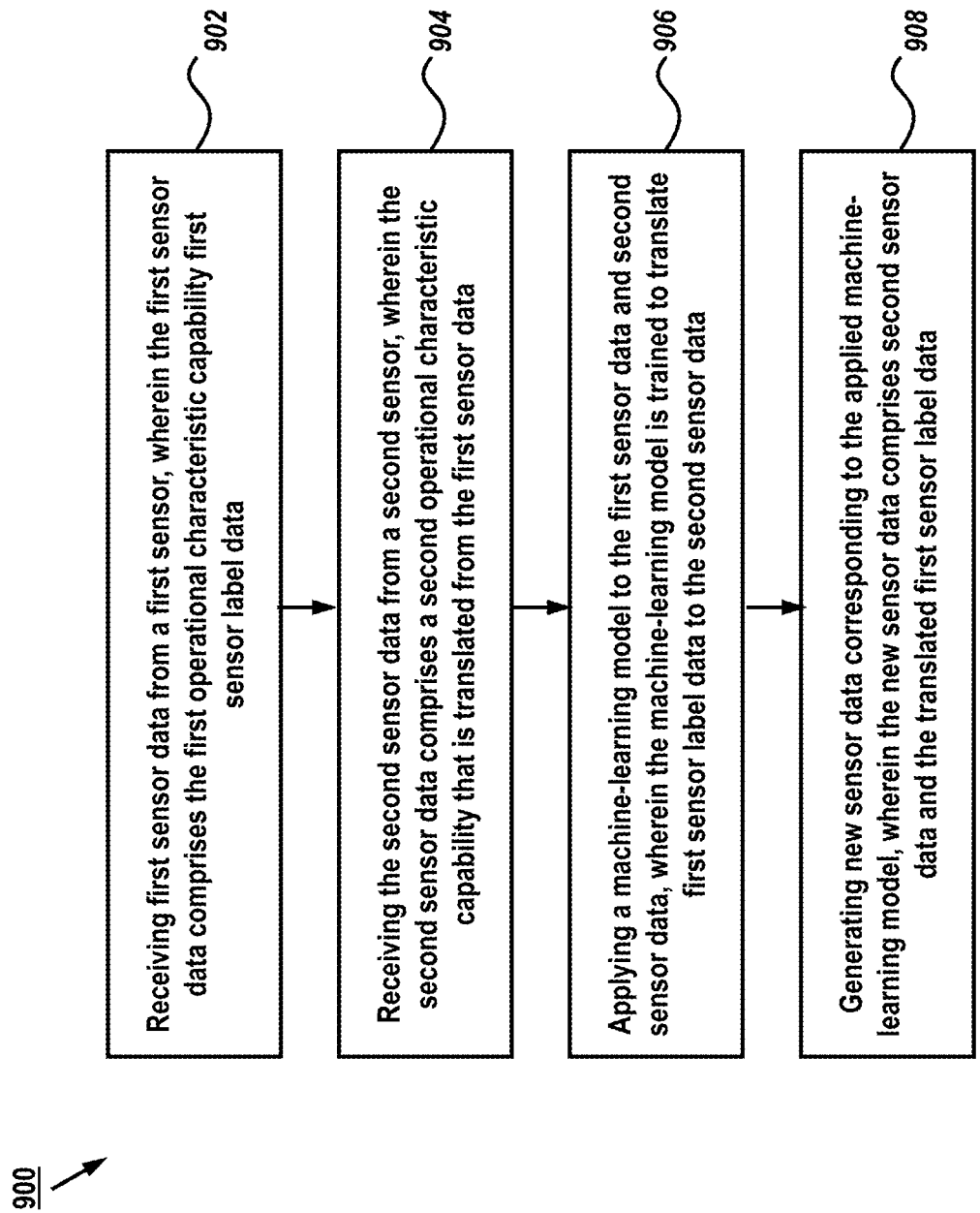
FIG. 9 shows another process flow for converting sensor data under some aspects of the present disclosure.

FIG. 9 shows another process flow 900 for converting sensor data under some aspects of the present disclosure. In this example, in block 902, the processing system may receive first sensor data from a first sensor (e.g., 702), wherein the first sensor data comprises first operational characteristic capability and first sensor label data (e.g., 704). In block 904, the processing system may receive second sensor data from a second sensor (e.g., 712), wherein the second sensor data comprises a second operational characteristic capability that is translated from the first sensor data (e.g., via 706). In block 906 the processing system may apply a machine-learning model (e.g., 716) to the first sensor data and second sensor data, wherein the machine-learning model is trained to infer first sensor label data to the second sensor data. In block 909, the processing system may generate new sensor data (e.g., 720) corresponding to the applied machine-learning model, wherein the new sensor data comprises second sensor data and the inferred first sensor label data.

Figure 10:
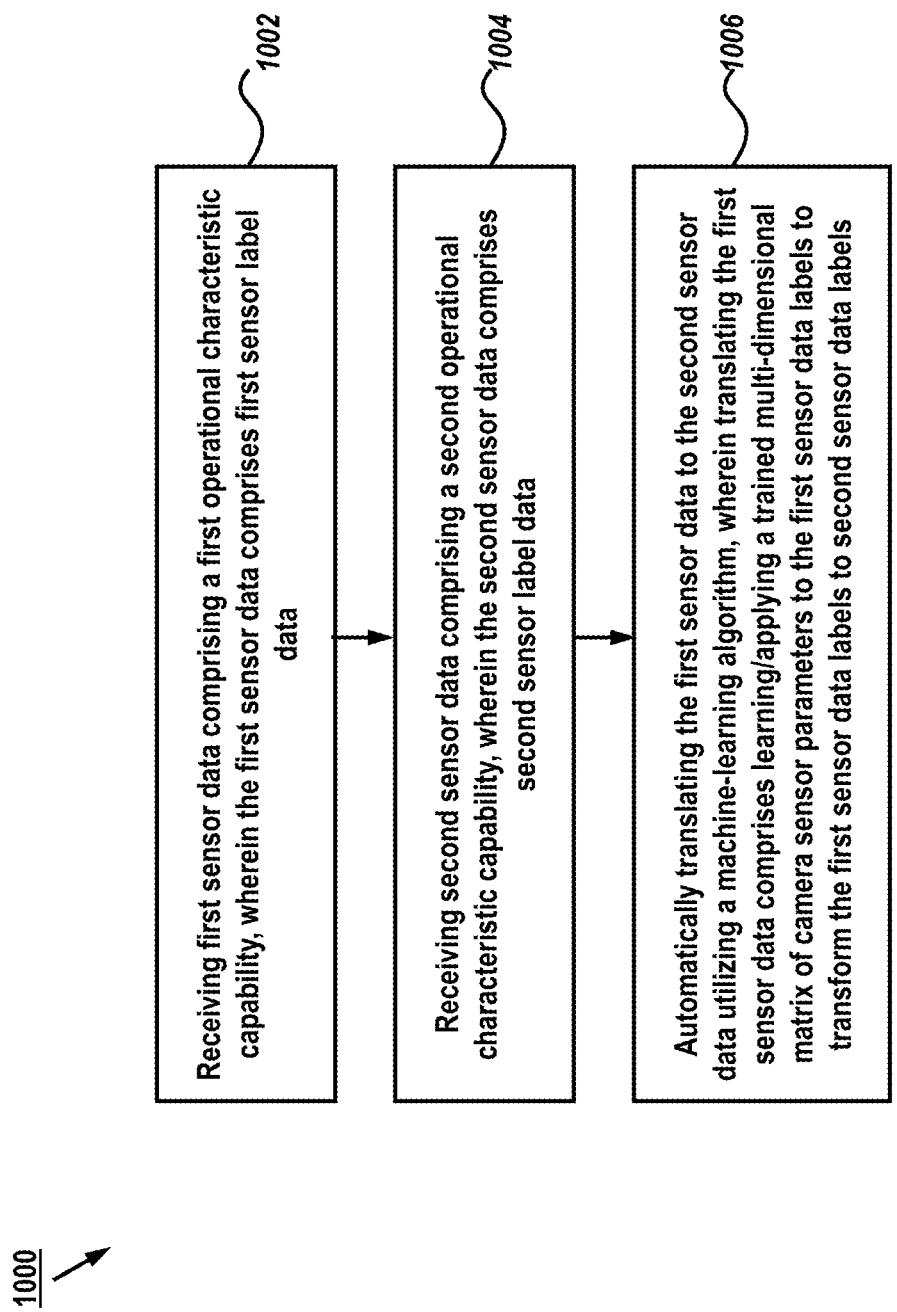
FIG. 10 shows a still further process flow for converting sensor data under some aspects of the present disclosure.

FIG. 10 shows a still further process flow for converting sensor data under some aspects of the present disclosure. In this example, in block 1002 a processing system may receive first sensor data comprising a first operational characteristic capability, wherein the first sensor data comprises first sensor label data. In block 1004, the processing system may receive second sensor data comprising a second operational characteristic capability, wherein the second sensor data comprises second sensor label data. In block 1006, the processing system may automatically translate the first sensor data to the second sensor data utilizing a machine-learning algorithm, wherein translating the first sensor data comprises applying a multi-dimensional matrix of camera sensor parameters (e.g., $\tilde{x}_s=K[R|t]p_w=Pp_w$) to the first sensor data labels to transform the first sensor data labels to second sensor data labels.

One of ordinary skill in the art will recognize that the technologies and techniques disclosed herein provide sensor translation abilities that allow translation of an entire data set of a source sensor to a target sensor, or only one or more characteristics of interest. Unlike conventional algorithms, which simply translate pictorial images, the technologies and techniques disclosed herein allow for a user to translate a characteristic of interest from a sensor including, but not limited to, sensor resolution, coloration, perspective, field-of-view, scanning pattern, maximum range and receiver characteristics. The sensor translation may be performed using paired sensor or unpaired sensors, discussed above. Additionally, sensor labels may be translated that are associated with the underlying sensor data.

As described above, some or all illustrated features may be omitted in a particular implementation within the scope of the present disclosure, and some illustrated features may not be required for implementation of all examples. In some examples, the methods and processes described herein may be performed by a vehicle (e.g., 101), as described above and/or by a processor/processing system or circuitry (e.g., 102-111, 210, 212) or by any suitable means for carrying out the described functions.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of converting sensor data for autonomous vehicle perception, comprising:
   receiving, by a processing system of an autonomous vehicle, first sensor data from a first sensor, wherein the first sensor data comprises a first operational characteristic capability and first sensor label data comprising at least one of semantic segmentation labels or bounding box masks;
   applying, by the processing system, a machine-learning model comprising an encoder-decoder network to the first sensor data, wherein the machine-learning model is trained to translate the first sensor data to emulate second sensor data comprising a second operational characteristic capability different from the first operational characteristic capability;
   generating, by the processing system, new sensor data corresponding to the applied machine-learning model, wherein the new sensor data comprises translated first sensor label data emulating the second operational characteristic capability; and
   applying, by the processing system, a loss function to the new sensor data to validate the accuracy of the new sensor data and translated first sensor label data; and
   configuring the processing system of the autonomous vehicle to perform object detection using the validated new sensor data and translated first sensor label data.

2. The method of claim 1, wherein applying the machine-learning model comprises applying a deep neural network (DNN).

3. The method of claim 2, wherein applying the DNN comprises processing the first sensor data via an encoder-decoder network and a generative adversarial network.

4. The method of claim 1, wherein applying the loss function to the new sensor data comprises applying a consistency loss function to the translated first sensor label data relative to the first sensor label data.

5. The method of claim 1, wherein applying the loss function to the new sensor data comprises
   applying a second machine-learning model to the new sensor data, wherein the second machine-learning model is trained to the first sensor label data to produce modified new sensor label data, and wherein the second machine-learning model comprises a deep convolutional neural network (DNN).

6. The method of claim 5, wherein the DNN comprises an encoder-decoder network and a generative adversarial network, configured to process the modified new sensor data in the opposite direction of the first machine learning model.

7. The method of claim 1, wherein the machine-learning model is trained to translate the first sensor data to emulate second sensor data in an unpaired data environment.

8. A method of converting sensor label data for autonomous vehicle perception, comprising:
   receiving, by a processing system of an autonomous vehicle, first sensor data from a first sensor, wherein the first sensor data comprises the first operational characteristic capability and first sensor label data comprising at least one of semantic segmentation labels or bounding box masks;
   receiving, by the processing system, second sensor data from a second sensor, wherein the second sensor data comprises a second operational characteristic capability different from the first operational characteristic capability;
   applying, by the processing system, a machine-learning model comprising an encoder-decoder network to the first sensor data and second sensor data, wherein the machine-learning model is trained to infer first sensor label data to the second sensor data;
   generating, by the processing system, new sensor data corresponding to the applied machine-learning model, wherein the new sensor data comprises the inferred first sensor label data emulating the second operational characteristic capability; and
   configuring the processing system of the autonomous vehicle to perform object detection using the new sensor data and inferred first sensor label data.

9. The method of claim 8, further comprising applying a loss function to the new sensor data to determine the accuracy of the inferred first sensor label data relative to the first sensor label data.

10. The method of claim 9, wherein the loss function comprises a consistency loss function.

11. The method of claim 8, wherein applying the machine-learning model comprises applying a deep neural network to the first sensor data, second sensor data, and first sensor label data.

12. The method of claim 8, wherein applying the machine-learning model to infer first sensor label data comprises applying extrinsic parameters of camera matrix data.

13. The method of claim 12, wherein applying the extrinsic parameters comprises transferring sensor labels to the new sensor data.

14. The method of claim 8, wherein the second sensor data is translated from the first sensor data via a generative adversarial network.

15. A method for translating sensor data for autonomous vehicle perception, comprising:
   receiving, by a processing system of an autonomous vehicle, first sensor data from a first sensor, wherein the first sensor data comprises a first operational characteristic capability and first sensor label data comprising at least one of semantic segmentation labels or bounding box masks;
   receiving, by the processing system, second sensor data from a second sensor, wherein the second sensor data comprises a second operational characteristic capability different from the first operational characteristic capability; and
   applying, by the processing system, a machine-learning model comprising an encoder-decoder network to the first sensor data and second sensor data in an unpaired data environment, wherein the machine-learning model is trained to translate the first sensor label data to emulate the second operational characteristic capability;
   generating, by the processing system, new sensor data corresponding to the applied machine-learning model, wherein the new sensor data comprises translated first sensor label data emulating the second operational characteristic capability;
   applying, by the processing system, a loss function to the new sensor data to validate the accuracy of the new sensor data and translated first sensor label data; and
   configuring the processing system of the autonomous vehicle to perform object detection using the validated new sensor data and translated first sensor label data.

16. The method of claim 15, wherein the camera sensor parameters comprise intrinsic and extrinsic coefficients representing three-dimensional world points and their corresponding two-dimensional image points.

17. The method of claim 16, wherein the extrinsic parameters represent a location of a first and second sensor in a three-dimensional scene, and the intrinsic parameters represent an optical center and focal length of the first and second sensor.

18. The method of claim 15, wherein translating the first sensor data to the second sensor data comprises applying a color mapping transformation to adjust coloration differences between the first sensor data and the second sensor data.

19. The method of claim 15, wherein translating the first sensor data to the second sensor data comprises adjusting for differences in temporal sampling intervals between the first sensor and the second sensor.

20. The method of claim 15, wherein the machine-learning algorithm comprises a reinforcement learning model configured to refine the accuracy of the transformed sensor data and associated label data using feedback derived from a validation process.

* * * * *